United States Patent [19]
Ruschke, Jr.

[11] 3,746,137
[45] July 17, 1973

[54] MULTIPLE-TORQUE SLIP CLUTCH

[75] Inventor: Lawrence J. Ruschke, Jr., Mount Prospect, Ill.

[73] Assignee: Bell & Howell Company, Chicago, Ill.

[22] Filed: July 7, 1972

[21] Appl. No.: 269,892

[52] U.S. Cl................. 192/48.5, 192/48.7, 192/52, 192/70.14, 64/30 R
[51] Int. Cl........................ F16d 7/02, F16d 21/08
[58] Field of Search.................. 192/48.5, 48.7, 52, 192/70.14, 70.21, 107 M; 64/30 R, 30 C

[56] References Cited
UNITED STATES PATENTS
1,953,187  4/1934  Nakashian .......................... 192/52
2,675,835  4/1954  Kiekhaefer ...................... 192/48.5 X FOREIGN PATENTS OR APPLICATIONS
349,279  5/1905  France ............................ 192/70.21

Primary Examiner—Allan D. Hermann
Attorney—James B. Blanchard

[57] ABSTRACT

A multiple-torque slip clutch having a torque transmitting assembly of friction disks of varying torque transmission characteristics and a drive unit adapted to engage selected friction disks in positive drive relationship to enable variation the slip torque transmission capability of the clutch.

16 Claims, 5 Drawing Figures

Patented July 17, 1973  3,746,137

MULTIPLE-TORQUE SLIP CLUTCH

This invention relates to a clutch assembly and, in particular, a multiple-torque slip clutch assembly.

In certain machine drives, a requirement exists for transmission of torque through a slip clutch but at different slip torque levels at different times during the operational cycle of the mechanism. The usual practice in meeting this need is to provide a separate slip clutch for each slip torque level required. Output torque may then be varied by switching from one slip clutch to another. This practice does enable selected variation of the slip torque level but concomitantly involves disadvantageous complexity, duplication of parts, and greater space requirements.

It is the principal object of the present invention to provide a single slip clutch assembly capable of selectively variable slip torque transmission level. In the clutch of the present invention, the requisite torque selection capability is attained by providing a frictional torque transmission assembly of plural friction disks of varying torque transmission characteristics, a first rotary motion transmission unit in frictional engagement with the disk assembly, and a second rotary motion transmission unit which is adapted to selectively engage one or more of the friction disks in positive drive relationship. By selectively varying the friction disks engaged by the second rotary motion transmission unit, the effective torque transmitting characteristics of the disk assembly may be incrementally varied, thereby selectively modifying the slip torque transmission level of the clutch. Either the first or the second rotary motion transmission unit may serve as a driving unit with the other functioning as a driven unit.

It is a further object of the present invention to provide a multiple-torque slip clutch which makes possible the provision of a multiple-torque transmission capability in a simple, compact structure. To attain this object, a rotatably journaled shaft is provided which carries a tubular carrier element adapted for rotation relative to the shaft. A frictional torque transmission assembly is, in turn, rotatably carried on the tubular element and comprises an assembly of plural friction disks of varying torque transmission characteristics, a first group of friction disks mounted for rotation relative to the axis of the carrier element, and a second group of friction disks also mounted for rotation relative to the axis of the carrier element and interleaved among the first group of friction disks. Each of the second group of friction disks has engageable means extending radially beyond the peripheral compass of the first group of friction disks. The tubular carrier element serves as a first motion transmission unit and includes a radially-extending flange for frictional engagement with one end of the frictional disk transmission assembly and a pressure plate keyed to the tubular carrier element for frictional engagement with the opposite end of the frictional disk torque transmission assembly. A bias spring serves to urge the pressure plate against one end of the frictional torque transmission assembly maintaining the friction disks in engagement with one another, and maintaining the opposite end of the torque transmission assembly in frictional engagement with the carrier element. A collar element is keyed to the rotatable shaft and is provided with a drive pin for positive engagement with one or more of the second group of friction disks. The collar element in combination with the rotatable shaft serves as the second motion transmission unit and by selective displacement, the collar element may be brought into positive drive engagement with one or more of the second group of friction disks to permit the value of slip torque transmitted through the frictional torque transmission assembly between the first motion transmission unit and the second motion transmission unit to be selectively varied.

These and other objects and features of the present invention will be better understood by reference to the following detailed description and the appended drawings.

Figure 1:
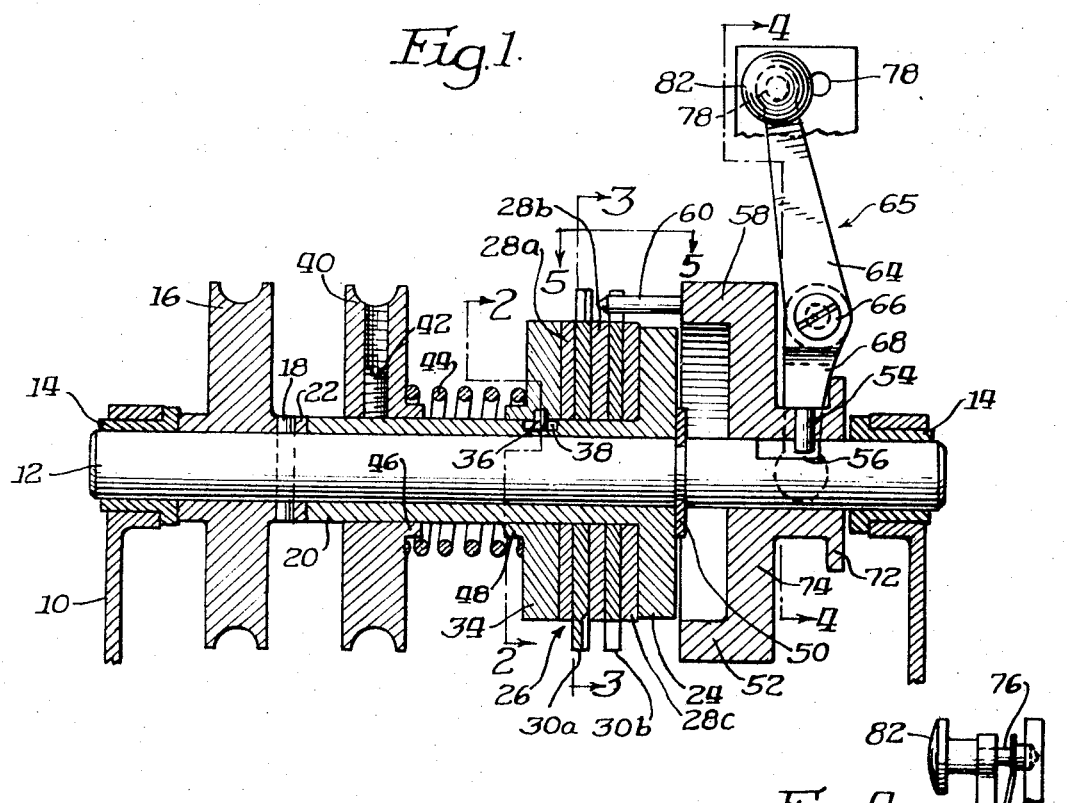
FIG. 1 is a cross-sectional view of a preferred embodiment multiple-torque slip clutch of the present invention.
Figure 2:
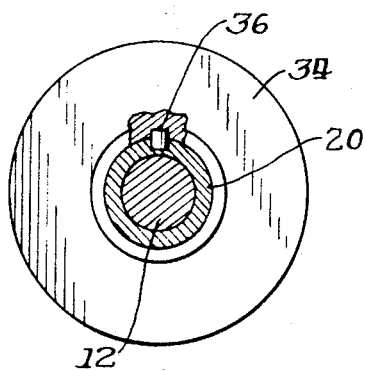
FIG. 2 is a cross-sectional view taken along lines 2—2 of FIG. 1.

Referring to FIG. 1, a preferred embodiment of the multiple-torque slip clutch is depicted mounted to a partially shown housing or frame 10. The clutch is supported on a shaft 12 which is journaled at each end in the frame 10 by bearings 14. A pulley 16 is affixed to the shaft 12 by a pin 18 passed through a collar of the pulley 16 and through the shaft 12.

A tubular carrier element 20 is coaxially mounted on the shaft 12 for rotation relative to the shaft 12. A bearing bushing 22 spaces one end of the tubular carrier element 20 from the pulley 16. At its opposite end, the tubular carrier element is provided with a radially-extending flange 24 which contains and frictionally engages one end of a core frictional torque transmitting assembly 26. The carrier element 20 is maintained in its axial position on the shaft 12 by a snap ring 50 which is engaged in an annular recess in the shaft 12.

The frictional torque transmitting assembly 26 comprises a first group of friction disks 28a, 28b and 28c each rotatably and coaxially mounted on the tubular carrier element 20 and having a diameter substantially equal to that of the carrier element flange 24. Alternately interleaved among the first group of friction disks 28 is a second group of friction disks which in the embodiment shown consists of two friction disks 30a and 30b each of which includes an engagement portion extending radially beyond the peripheral compass of the first group of friction disks 28a, 28b and 28c.

The facial surfaces of friction disks 28a, 28b and 28c preferably have the same coefficient of friction. However, in order to achieve the desired selective variation of slip torque transmission level in the clutch assembly of FIG. 1, the friction disk 30a is fabricated to have facial surfaces of a greater coefficient of friction than the facial surfaces of the friction disk 30b. As described hereinafter, the level of slip torque transmission through the clutch assembly varies depending upon whether one or both of the friction disks 30a and 30b are engaged in a positive drive mode. To insure proper operation, the coefficients of friction of the facial surfaces of friction disks 28a, 28b, 28c and the cooperating facial drive surfaces of the pressure plate 34 and the flange 24 are preferably higher than the coefficient of friction of the facial drive surfaces of either of the friction disks 30a and 30b.

At the opposite end of the frictional torque transmission assembly 26 from the flange 24, a pressure plate 34 is provided. The pressure plate 34 is keyed to the tubular carrier element 20 by a pin 36 received in an axially-extending slot 38 in the periphery of the carrier element 20. The pressure plate 34 is thus secured to the carrier element 20 to rotate therewith but is axially displaceable relative thereto. Spaced from the pressure plate 34 is a pulley 40 which is rigidly affixed to the tubular carrier element 20 by a set screw 42 for transmitting rotary motion to or from the carrier element 20. Interposed between the pressure plate 34 and the pulley 40 is a compression spring 44 which is supported at one end by an annular collar 46 on the pulley 40 and at its opposite end by an annular collar 48 on the pressure plate 34. The compression spring 44 functions to bias the pressure plate 34 against the frictional torque transmitting disk assembly 26 to effect frictional engagement between the pressure plate 34 and the friction disk 28a, between adjacent surfaces of the friction disks 28a, 30a, 28b, 30b and 28c, and between the friction disk 28c and the flange 24.

A collar element 52 is keyed to the shaft 12 by a pin 54 received in an axially-extending slot 56. The collar element 52 is thus arranged for rotation with the shaft 12 and for axial displacement relative thereto. The collar 52 includes an axially-extending annular lip portion 58 having an internal diameter which is greater than the maximum external diameter of the flange 24 of the carrier element 20 and the first group of the friction disks 28a, 28b and 28c. The annular lip 58 is thereby adapted to axially extend over the flange 24 and a portion of the frictional torque transmission assembly 26.

Figures 3, 4:
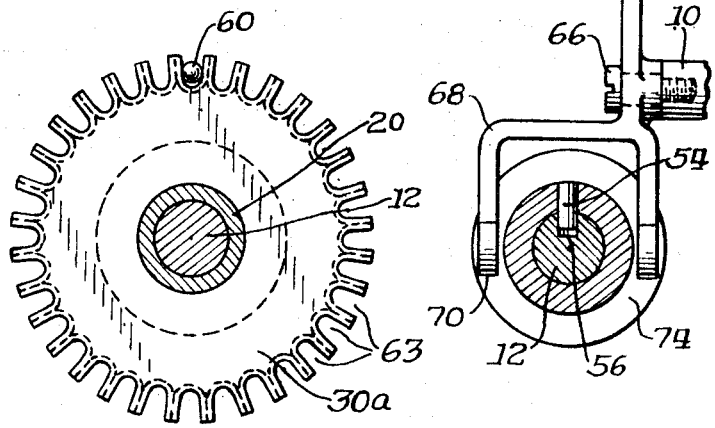
FIG. 3 is a cross-sectional view taken along lines 3—3 of FIG. 1.
FIG. 4 is a cross-sectional view taken along lines 4—4 of FIG. 1.
Figure 5:
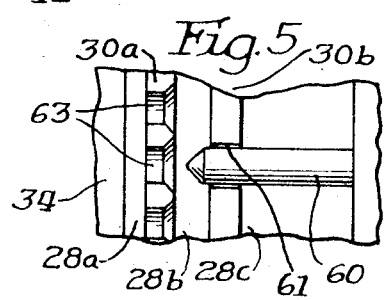
FIG. 5 is an enlarged cross-sectional view of a portion of the slip clutch taken at lines 5—5 of FIG. 1.

A pointed drive pin 60 axially extends from the lip 58 of the collar element to provide positive driving engagement capability between the collar element 52 and the friction disks 30a and 30b. As depicted in FIGS. 3 and 5, friction disk 30a is provided with an annularly arranged plurality of radially-oriented slots or openings 63 having beveled edges to facilitate insertion of the pointed drive pin 60 while the clutch is under load. The friction disk 30b, on the other hand, is provided with a single slot or opening 61 with which the drive pin 60 is engaged at all times.

In operation, the tubular carrier element 20, pressure plate 34, and pulley 40 form a first rotary motion transmission unit in frictional engagement with the torque transmitting disk assembly 26 while the collar element 52, shaft 12, and pulley 16 form a second rotary transmission unit in selective positive drive engagement with the torque transmitting disk assembly 26. Either of the pulleys 16 or 40 may be utilized as the input or drive pulley connected to the machine drive mechanism with the other pulley functioning as the output or driven pulley connected to the driven mechanism or load.

In FIG. 1, the drive pin 60 is shown axially positioned to engage only the friction disk 30b in positive drive engagement. A given level of slip torque may thus be transmitted between the collar element 52 and the carrier element 20. However, if the collar element 52 is displaced axially in the direction toward the friction disk assembly 26 so as to additionally bring the drive pin 60 into positive drive engagement with the second friction disk 30a (as depicted in phantom view in FIG. 1), the level of slip torque which may be transmitted between the collar element 52 and the carrier element 20 is incrementally increased since the torque transmission path through the interfaces between disk 30a and disk 28a and between disk 28a and pressure plate 34 will support a greater slip torque level than a torque transmission path through the interfaces associated with the disk 30b. In this manner, the slip torque transmission capability of the slip clutch shown may be selectively shifted between predetermined first and second slip torque levels.

The embodiment shown in FIG. 1 permits only two levels of slip torque transmission to be selected since there are only two of the positive drive friction disks 30a and 30b available for engagement by the drive pin 60. It will be apparent, however, that a greater number of selectable slip torque transmission levels may be provided by increasing the number of positive drive friction disks engageable by the drive pin 60. Each additional positive drive friction disk should have an incrementally higher coefficient of friction to provide an incrementally higher slip torque transmission level.

In order to facilitate the axial positioning of the collar element 52 to provide a given slip torque transmission level, a suitable positioning means may be provided. In FIGS. 1 and 4, a particular positioning assembly 65 is shown by way of example only. It should be understood that the form of particular positioning means employed in a given application will depend on the need of the particular application. In the assembly 65 shown, there is provided a lever 64 pivotally mounted intermediate its ends by fixedly positioned pivot pin 66. The lower end of the lever 64 on one side of the pivot pin 66 is in the form of a bifurcated U-shape yoke 68 with the terminus of each yoke arm being in the configurated form of a circular disk 70. The yoke disks 70 are axially entrapped in positive engagement between a ring 72 of the collar element 52 and the radially-extending face 74 of the collar element 52.

The upper end of the lever arm 64 on the opposite side of the pin 62 from the yoke portion 68 is provided with a positioning pin 76 mounted for axial displacement in an aperture in the upper end of the lever arm 64 and engageable with either of two arcuately-spaced, fixedly-positioned detents 78. The positioning pin 76 is axially biased in the direction toward the detents 78 by a leaf spring 80. A knob 82 is fixedly attached to the positioning pin 76 to permit manual withdrawal of the pin 76 from the other detent 78 in which it is engaged for manual arcuate placement of the lever arm and engagement of the positioning pin 76 in the other detent 78. As is apparent, the pivotal movement of the lever arm 64 from one detent position to the other effects an axial displacement of the collar element 52 for engagement alternatively with either one or both of the friction disks 30. Thus in the particular embodiment shown, a clutch may manually be shifted between a high slip torque level setting and a low slip torque level setting. In an embodiment in which more than two levels of slip torque are required, it will be apparent that a greater number of the engageable positive drive friction disks and a greater number of detent positions for the lever arm 64 will be provided.

It should be noted that in lieu of providing differing coefficients of friction for the positive drive friction disks 30a and 30b, variation in the slip torque level may also be achieved by providing differing diameters among the friction disks 28a, 28b, and 28c.

From the foregoing detailed description, it is seen that the present invention provides in a compact, simple structure a slip clutch in which the slip torque output may be carried selectively and incrementally. It will be apparent to those skilled in the art that the particular embodiment shown and described herein by way of example may be modified in various respects without departing from the scope of the inventive concepts.

What is claimed is:

1. A multiple-torque slip clutch comprising:
   an assembly of friction disks of differing torque transmission capability mounted for rotation about a common axis;
   a first rotary motion transmission unit;
   means axially urging said friction disks into frictional engagement with one another and urging said assembly of friction disks into frictional engagement with said first rotary motion transmission unit; and
   a second rotary motion transmission unit having means for positive engagement with selected friction disks such that the value of slip torque transmitted between said first and second rotary motion transmission units may selectively be varied.

2. A multiple-torque slip clutch comprising:
   a first plurality of friction disks mounted for rotation about a common axis;
   a second plurality of friction disks mounted for rotation about said common axis and interleaved among and interfaced with said first plurality of friction disks to form a frictional torque transmission assembly, each of said second plurality of friction disks having engageable means positioned radially beyond the peripheral compass of said first plurality of friction disks the torque transmitting characteristics of the interfaces associated with one of said second plurality of friction disk differing from that associated with others of said second plurality of friction disks;
   a first rotary motion transmission means mounted for rotation about said common axis and engagement with said frictional torque transmission assembly;
   means axially urging said first plurality of friction disks and said second plurality of friction disks into frictional engagement with one another and maintaining said frictional torque transmission assembly in engagement with said first motion transmission member; and
   a second rotary motion transmission means mounted for rotation about said common axis and having means for positive engagement with said radially-extending engageable means of selected ones of second plurality of friction disks such that the value of slip torque transmitted between said first and second motion transmission means may selectively be varied.

3. The invention defined in claim 2 wherein said second motion transmission means comprises a collar selectively displaceable along said common axis relative to said frictional torque transmission assembly and including axially-extending drive element positioned for positive engagement with said radially-positioned engageable means of selected ones of said second plurality of friction disks by selected displacement of said collar relative to said frictional torque transmission assembly.

4. The invention defined in claim 3 wherein said radially-positioned engageable means of each of said second plurality of friction disks comprises means defining at least one opening and wherein said drive element selectively displaceable collar is adapted for positive driving engagement therewith.

5. The invention defined in claim 4 wherein at least one of said second plurality of friction disks includes an annularly arranged plurality of said openings each adapted to axially receive said drive element in positive driving engagement.

6. A multiple-torque slip clutch comprising:
   a rotatably-mounted cylindrical carrier element having a radially-extending flange;
   a first plurality of friction disks mounted on said carrier element for rotation relative thereto;
   a second plurality of friction disks of differing frictional surface characteristics mounted on said carrier element for rotation relative thereto and interleaved among first plurality of friction disks to form a frictional torque transmission assembly, each of said second plurality of friction disks having a portion extending radially beyond the peripheral compass of said first plurality of friction disks;
   means axially urging said first plurality of friction disks and said second plurality of friction disks into frictional engagement with one another and axially urging said frictional torque transmission assembly into engagement with said flange; and
   a rotatable coaxially mounted collar element having means for positive engagement with said radially-extending portion of selected ones of said second plurality of friction disks whereby the value of torque transmitted between said carrier element and said collar element may selectively be varied.

7. The invention defined in claim 6 wherein said collar element is selectively axially displacable relative to said frictional torque transmission assembly and includes an axially-extending drive pin positioned for positive engagement with said radially-extending portion of one or more of said second plurality of friction disks as determined by selective displacement of said collar element relative to said frictional torque transmission assembly.

8. The invention defined in claim 7 wherein said radially-extending portion of each of said second plurality of friction disks comprises means defining at least one opening and wherein said drive pin of said selectively displaceable collar element is positioned for positive driving engagement therewith.

9. The invention defined in claim 8 wherein at least one of said second plurality of friction disks includes an annularly arranged plurality of said opening adapted to axially receive said drive pin in positive driving engagement.

10. A multiple-torque slip clutch comprising:
    a rotatably-mounted shaft;
    a first motion transmission member affixed to said shaft and rotatable therewith;
    a tubular carrier element mounted coaxially on said shaft for rotation relative thereto and having a flange radially-extending from one portion of said carrier element;
    a second motion transmission member affixed to the opposite end portion of said carrier element and rotatable therewith;
    a first plurality of friction disks mounted on said carrier element for rotation relative thereto;

a second plurality of friction disks of differing frictional surface characteristics mounted on said carrier element for rotation relative thereto and interleaved among said first plurality of said friction disks to form a frictional torque transmission assembly, each of said second plurality of friction disks having a portion extending radially beyond the peripheral compass of said first plurality of said friction disks;

means axially urging said first plurality of friction disks and said second plurality of friction disks into frictional engagement with one another and axially urging said frictional torque transmission assembly into engagement with said carrier element flange; and a collar element mounted coaxially on said shaft, said collar element being keyed to said shaft for rotation therewith and for selective axial displacement on said shaft relative to said frictional torque transmission assembly, said collar element having means for positive engagement with said radially-extending portion of a selectively variable number of said second plurality of friction disks such that the value of torque transmitted between said first motion transmission element and said second motion transmission element may be selectively and incrementally varied.

11. The invention defined in claim 10 wherein said carrier element flange is interposed between said frictional torque transmission assembly and said collar element and wherein said collar element includes an axially-extending drive pin positioned for positive engagement with said radially-extending engageable means of one or more of said second plurality of friction disks as determined by selected displacement of said collar element relative to said frictional torque transmission assembly.

12. The invention defined in claim 11 wherein said radially-extending portion of each of said second plurality of friction disks comprises means defining at least one opening and wherein said drive pin of said selectively-displaceable collar element is adapted for positive driving engagement therewith.

13. The invention defined in claim 12 wherein at least one of said second plurality of friction disks includes an annularly arranged plurality of said openings adapted to axially receive said drive pin in positive driving engagement.

14. The invention defined in claim 10 wherein said axially urging means comprises:

a pressure plate mounted coaxially on said tubular carrier element, said pressure plate being keyed to said carrier element for rotation therewith and for movement axially relative thereto; and a compression spring urging said pressure plate into frictional engagement with one end of said frictional torque transmission assembly to urge said first plurality of friction disks and said second plurality of friction disks into frictional engagement with one another and to maintain the opposite end of said frictional torque transmission assembly in frictional engagement with said carrier element flange.

15. The invention defined in claim 10 further comprising manually operable means for selectively axially positioning said drive pin in at least first and second axial positions, said drive pin in said first axial position engaging a first predetermined number of said second plurality of friction disks whereby a first value of slip torque may be transmitted between said first and second motion transmission elements, said drive pin in said second axial position engaging a predetermined greater number of said second plurality of friction disks whereby a second greater value of slip torque may be transmitted between said first and second motion transmission members.

16. The invention defined in claim 10 wherein said first and second motion transmission members each comprises a pulley.

* * * * *